United States Patent [19]

Anamateros et al.

[11] Patent Number: 4,741,671
[45] Date of Patent: May 3, 1988

[54] METAL HUB FOR A HELICOPTER ROTOR

[75] Inventors: Emmanovel Anamateros, Cascina Costa Di Samarate; Vittorio Caramaschi, Gallarate, both of Italy

[73] Assignee: Costruzioni Aeronautiche Giovanni Agusta S.p.A., Cascina Costa Di Samarate, Italy

[21] Appl. No.: 830,558

[22] Filed: Feb. 18, 1986

[30] Foreign Application Priority Data

Feb. 19, 1985 [IT] Italy ................................ 67168 A/85

[51] Int. Cl.⁴ ............................................ B64C 11/06
[52] U.S. Cl. .......................... 416/244 R; 416/138 A; 416/140 A
[58] Field of Search ............... 416/244 R, 141, 244 D, 416/134 A, 140 A, 138 A

[56] References Cited

U.S. PATENT DOCUMENTS

| 3,591,310 | 7/1971 | Mouille | 416/244 |
| 4,195,967 | 4/1980 | Weiland | 416/244 D |
| 4,342,540 | 8/1982 | Lovera et al. | 416/138 A |
| 4,369,019 | 1/1983 | Lovera et al. | 416/138 A |
| 4,512,717 | 4/1985 | Pancotti et al. | 416/244 D |
| 4,516,909 | 5/1985 | Caramaschi et al. | 416/140 A |

Primary Examiner—Robert E. Garrett
Assistant Examiner—John T. Kwon
Attorney, Agent, or Firm—Kane, Dalsimer, Sullivan, Kurucz, Levy, Eisele, and Richard

[57] ABSTRACT

Metal hub for a helicopter rotor, on which a metal center element is connected to an outer annular frame for anchoring the rotor blades by use of a number of identical metal spokes connected, at one end, to the center element and each acting, at the other end, as a connecting element for two identical, adjacent metal segments on the outer frame.

4 Claims, 2 Drawing Sheets

METAL HUB FOR A HELICOPTER ROTOR

BACKGROUND OF THE INVENTION

The present invention relates to a metal hub for a helicopter rotor.

Helicopter rotors are known to involve a hub, the outer contour of which is substantially defined by a number of bridge structures equal in number to the blades and defining, together with a tubular center body on the hub, a number of apertures, each fitted through with a fork for connecting a respective blade.

Hubs of the aforementioned type are generally made of composite material and generally involve such high cost as to be justifiable only in cases requiring considerably high performance.

SUMMARY OF THE INVENTION

The aim of the present invention is to provide a hub for a helicopter rotor, the structure and materials of which are such as to minimise manufacturing cost, but with no noticeable reduction in hub performance as compared with corresponding hubs of composite material.

With this aim in view, according to the present invention, there is provided a hub for a helicopter rotor with n blades, the said hub comprising a metal center element, an outer annular frame extending about the said center element, an an intermediate structure connecting the said frame to the said center element, characterised by the fact that the said intermediate structure comprises n identical metal spokes extending radially outwards from the said center element; and that the said annular frame comprises n identical metal segments; the segments in each pair of adjacent said segments being connected to each other and to an outer end of a respective said spoke.

BRIEF DESCRIPTION OF THE DRAWINGS

A non-limiting example of the present invention will now be described with reference to the accompanying drawings in which.

DETAILED DESCRIPTION OF THE INVENTION

Figure 1:
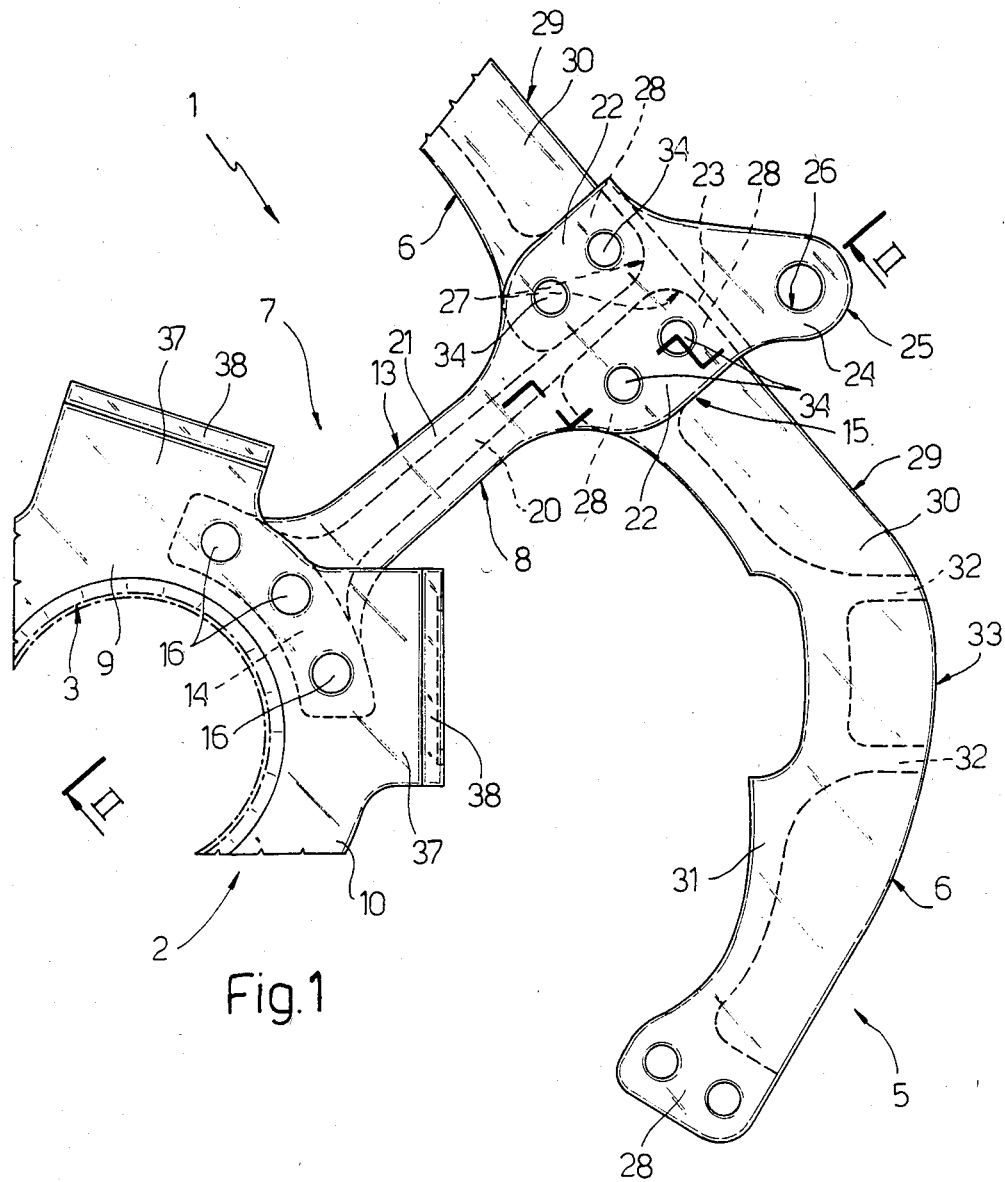
FIG. 1 shows a partial plan view of a hub in accordance with the present invention.

The attached Figures show a hub 1 for a helicopter rotor with n blades (not shown), the said hub comprising a metal, tubular, center element 2 having an axial through hole 3 the surface of which presents a number of axial grooves 4 designed to enable hub 1 to be fitted onto a drive shaft (not shown) engaged inside hole 3. Hub 1 also comprises an outer annular frame 5 presenting a plan in the form of a polygon with n sides and rounded tips, the said frame 5 consisting of n curved segments 6 connected integral with one another and each defining one of the said tips.

Hub 1 also comprises an intermediate structure 7 consisting of n spokes 8 extending radially outwards from center element 2 and each connected externally to the centre line of a respective side on annular frame 5.

Figure 2:
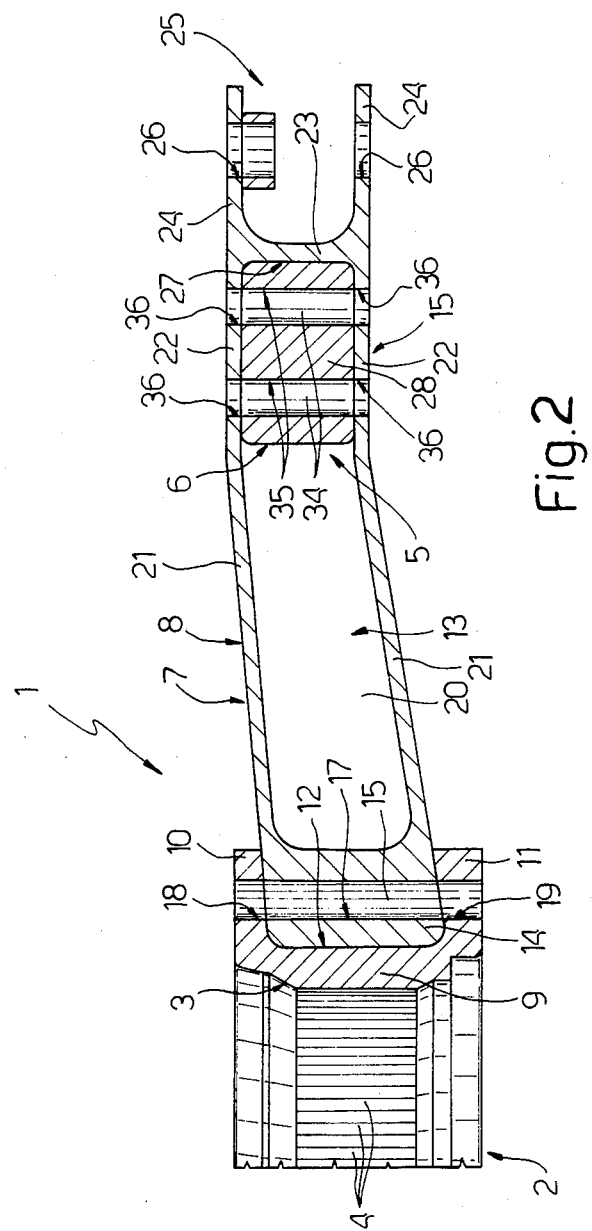
FIG. 2 shows a section along line II—II in FIG. 1.

As shown, particularly in FIG. 2, center element 2 comprises a tubular body 9 having, on its opposite ends, a top annular flange 10 and a bottom annular flange 11, the said flanges combining to define an annular groove 12 extending about the whole of tubular body 9.

Each of spokes 8 consists of metal material and comprises an intermediate portion 13 consisting of a double T section, an inner end head 14 for its own connection to tubular body 9, and an outer end head 15 located between the facing ends of two adjacent segments 6 and connected to the same.

Head 14 substantially consists of a curved plate concentric with tubular body 9 and inserted inside groove 12 where it is secured in removable manner by means of three through pins 16 engaged inside respective holes 17, formed through head 15 and parallel with hole 3, and inside respective holes 18 and 19, formed through flanges 10 and 11 and coaxial with holes 17.

Intermediate portion 13 comprises an inner core 20 connected to two wings 21 each of which widens out, at head 15, to form two lobes 22 arranged symmetrically in relation to core 20.

Head 15 is closed, on its outer end, by a plate 23 perpendicular to the axis of respective spoke 8 and from which project radially outwards arms 24 of a fork 25 having holes 26 for connecting a hydraulic damper (not shown) for damping oscillation of a respective blade (not shown) in the hub 1 plane.

Together with plate 23 and core 20, each pair of facing lobes 22 defines a recess 27 housing an end head 28 of a segment 6.

Each segment 6 is provided with two identical end heads 28 and presents an intermediate part consisting of a C section 29 with its concave side facing outwards. In more detail, section 29 is curved and comprises two wings 30 joined together by a core 31 and by two ribs 32 extending radially outwards from core 31 in such a manner as to reinforce a center portion 33 of section 29, located on a respective rounded tip of frame 5 and constituting a connecting portion for a respective blade (not shown).

Each head 28 is locked inside respective recess 27 by means of two pins 34 extending in removable manner through respective through holes 35 formed in head 28, and through respective through holes 36 aligned with through holes 35 and formed through lobes 22.

As shown in FIG. 1, facing each center portion 33, each flange 10 and 11 is provided with a substantially radial appendix 37 having, on its free end, a bent edge 38 lying in a plane parallel with the axis of hole 3, and defining, together with the other coplanare edge 38, a connecting surface for known supporting elements (not shown) supporting the blade (not shown) connected to respective center portion 33.

From the foregoing description, it will be clear that, by virtue of the identical nature of both spokes 8 and segments 6, hub 1 provides for extremely straightforward construction and simple, fast assembly.

Consequently, hub 1 as described, while at the same time preserving acceptable physical characteristics, undoubtedly provides for lower manufacturing cost as compared with hubs of similar design made of composite material.

We claim:

1. A hub for a helicopter rotor with n blades, the hub comprising a metal center element, a metal outer annular frame extending about said metal center element and comprising n identical metal segments, and an intermediate structure connecting said metal frame to said metal center element and comprising n identical metal spokes extending radially outward from said metal center element; each said metal spoke comprising an outer end acting as a connecting element for connecting two adjacent said metal segments to each other.

2. A hub as claimed in claim 1, wherein removable connecting means are provided for connecting the opposite ends of each said metal spoke to said metal center element and to said metal outer frame respectively.

3. A hub as claimed in claim 1, wherein said metal center element comprises a tubular body having at its opposite ends, two flanges defining an annular groove; an inner end of each said metal spoke being housed inside said groove.

4. A hub as claimed in claim 1, wherein a fork extends outward from said outer end of each said metal spoke and outside said metal outer frame.

* * * * *